United States Patent [19]

Virlon

[11] 4,137,785
[45] Feb. 6, 1979

[54] SPEED TRANSMISSION DEVICES

[76] Inventor: Jean-Claude Virlon, 15 rue de la Croix Blanche, Collegien, France, 77400

[21] Appl. No.: 730,127

[22] Filed: Oct. 6, 1976

[30] Foreign Application Priority Data

Oct. 7, 1975 [LU] Luxembourg .................... 73541

[51] Int. Cl.² ............................................ F16H 15/08
[52] U.S. Cl. ........................................ 74/194; 74/199
[58] Field of Search ............... 74/199, 194, 190.5, 74/691, 690, 796, 798

[56] References Cited

U.S. PATENT DOCUMENTS

| | | | |
|---|---|---|---|
| 1,216,626 | 2/1917 | Tarrisse | 74/194 |
| 1,276,172 | 8/1918 | Burrell | 74/194 |
| 1,496,123 | 6/1924 | Jones | 74/190.5 |
| 2,218,651 | 10/1940 | Lenney | 74/194 |
| 3,875,814 | 4/1975 | Steuer | 74/194 |

*Primary Examiner*—Benjamin W. Wyche
*Assistant Examiner*—Wesley S. Ratliff, Jr.
*Attorney, Agent, or Firm*—Weiser, Stapler & Spivak

[57] ABSTRACT

Speed change mechanism using spaced, rotatable input and output plates, and idlers in rolling point contact with same, and having freedom to oscillate relative to their own guidance shaft about the perpendicular passing through the contact points. The connection between the idlers and the guidance shaft is by entrainment members which can be displaced along the shafts, fix the idlers to the shafts by rotation, and enable oscillating deflection of the idlers about the perpendicular.

17 Claims, 14 Drawing Figures

SPEED TRANSMISSION DEVICES

The invention relates generally to improvements made in mechanical speed changer transmission devices particularly for automotive vehicle.

The invention relates more particularly to improvements in an automatic mechanical speed changer transmission in which the changer includes an input shaft carrying two circular plates fixed for rotation with that shaft, the said plates being spaced one from the other, at least one pair of idlers being positioned within that space and capable of being displaced radially between the plates, the idlers of one pair bearing with rolling contact upon the confronting faces of the plates, a control device acting at least upon the radial position of the pair of idlers, the idlers of one pair are mounted for oscillation about a radial displacement guidance axle, in such manner that the above-mentioned idlers may assume a position inclined relative to their guidance axle, at least during the period of control of the variation in radial position, thanks to which one obtains a self-displacement of idlers either in the direction of the greater demultiplication ratio, or in the direction of the smaller ratio; the idlers of one pair are mounted each for oscillation on their guidance shaft about the perpendicular passing through the contact points between idlers and plates.

The invention has for its principal objective, in a transmission of the type described above, to provide means adapted to increase the control sensitivity of radial displacement of the idlers of the changer while reducing the effort needed to start their self-displacement and, on the other hand, to provide control means for the self-displacement of the said idlers, adapted to provide a continuous variation which is totally automatic and is a function on the one hand, of the speed of the output shaft of the changer (load) and, on the other hand, a function of the resistant couple.

To that end, the invention relates to a speed changing transmission device, particularly for automobile vehicle, comprising a mechanical speed changer having an input shaft and an output shaft, one of which bears two plates fixed for rotation and spaced one from the other, at least one pair of idlers carried by a fork and positioned within said space and capable of being displaced radially between these plates along guidance shafts to which they are fixed for rotation, the idlers of one pair bearing with rolling point contact against the plates subjected to a pressure force tending to push them against the idlers, a control device connected to the transmission by at least a couple regulator enabling modification of the radial position of the said pair of idlers, the idlers of one pair being each mounted upon its guidance shaft for oscillation about a perpendicular to the contact points between idlers and plates, the device being characterized in that the connection between the idlers and guidance shaft is provided by entrainment members so arranged, on the one hand, as to be axially displaced along the said shafts, on the other hand, to fixedly attach for rotation the idlers and the shaft, also on the other hand, to permit free deflection of the idlers around the perpendicular passing through the contact points between idlers and plates.

According to one embodiment of the invention, the idlers of one pair bear, on the one hand, with rolling point contact against each other and, on the other hand, with rolling point contact against the plates.

According to another embodiment of the invention, the idlers of a given pair are attached to a deflection control fork by means of a ball bearing, each pair of idlers receiving its movement from a pair of rotary discs positioned between the plates of the changer, each disc being provided with at least one spiral-form radial slot in which there is engaged the end of a shaft carried by the said fork.

According to a characteristic of the invention, the input shaft or the output shaft of the changer is provided with a couple regulator acting upon the transmission ratio when the couple exceeds a predetermined threshold, this couple regulator being constituted by an elastic coupling formed of two cams having annular cam paths of sinusoidal configuration, facing each other, and in contact with each other by means of idlers or ball bearings, a first cam being able, upon increase of the resistant couple, to rotate about one of the input or output shafts of the transmission and produce axial displacement of a second cam fixed for rotation to the said shaft, the said axial displacement being suitable for producing a modification of the transmission ratio between the input shaft and the output shaft of the changer.

The operating means which control the deflection and, consequently, the radial position of the idlers are constituted, on the one hand, by a centrifugal regulator positioned upon the output shaft of the changer (load) and appropriate for modifying the radial position of the idlers as a function of the rotational speed of the said output shaft, by a couple regulator positioned upon the input shaft of the changer and suitable for correspondingly modifying the radial position of the idlers when the resistant couple exceeds a predetermined threshold.

In accordance with one mode of realization the oscillatory connection between idlers and guidance shafts is achieved by ball bearings positioned within channels in two parts, of spherical transverse profile, one part of each channel being formed in the radial thickness of an idler, the other part being formed in the space which separates axial channels provided in the generating surfaces of the guidance shafts.

In accordance with another mode of realization, the oscillating connection between idlers and guidance shafts is accomplished by entrainment members possessing on the one hand, a spherical contact surface positioned within a recess of spherical profile provided in the internal opening of the idler and, on the other hand, opposite to the said spherical contact face, a second plane contact face bearing upon a plane guidance land provided upon the guidance shaft of the idlers.

In accordance with another mode of realization, the oscillating connection between idlers and guidance shaft is of gimbal type, this connection being provided by an entrainment member which takes the form of a ring coaxially positioned within the internal opening of an idler, the ring being symmetrically thinned out on one side and the other of its median plane of rotation, this ring being capable of oscillating, on the one hand, about two first axles diametrically opposed to each other and positioned upon a ring capable of sliding upon the idler bearing shaft and, on the other hand, capable of ocsillating around two second diametrically opposed axles, displaced by 90 degrees with respect to the first two axles, the said second axles being fixed to the idler, thanks to which there is achieved a gimbal suspension particularly appropriate for the transmission of the couple between the plates, idlers and idler bearing shafts.

Finally, according to another embodiment, the oscillating connection between idlers and shafts is provided by entrainment members of elastic material, for example of elastomeric type.

Other embodiments, characteristics and advantages will appear from the detailed description of embodiments of the invention illustrated by way of example in the accompanying drawings in which.

According to a mode of realization, illustrated in FIGS. 1 to 4, the transmission changer is designated by the general reference 1.

Figure 1:
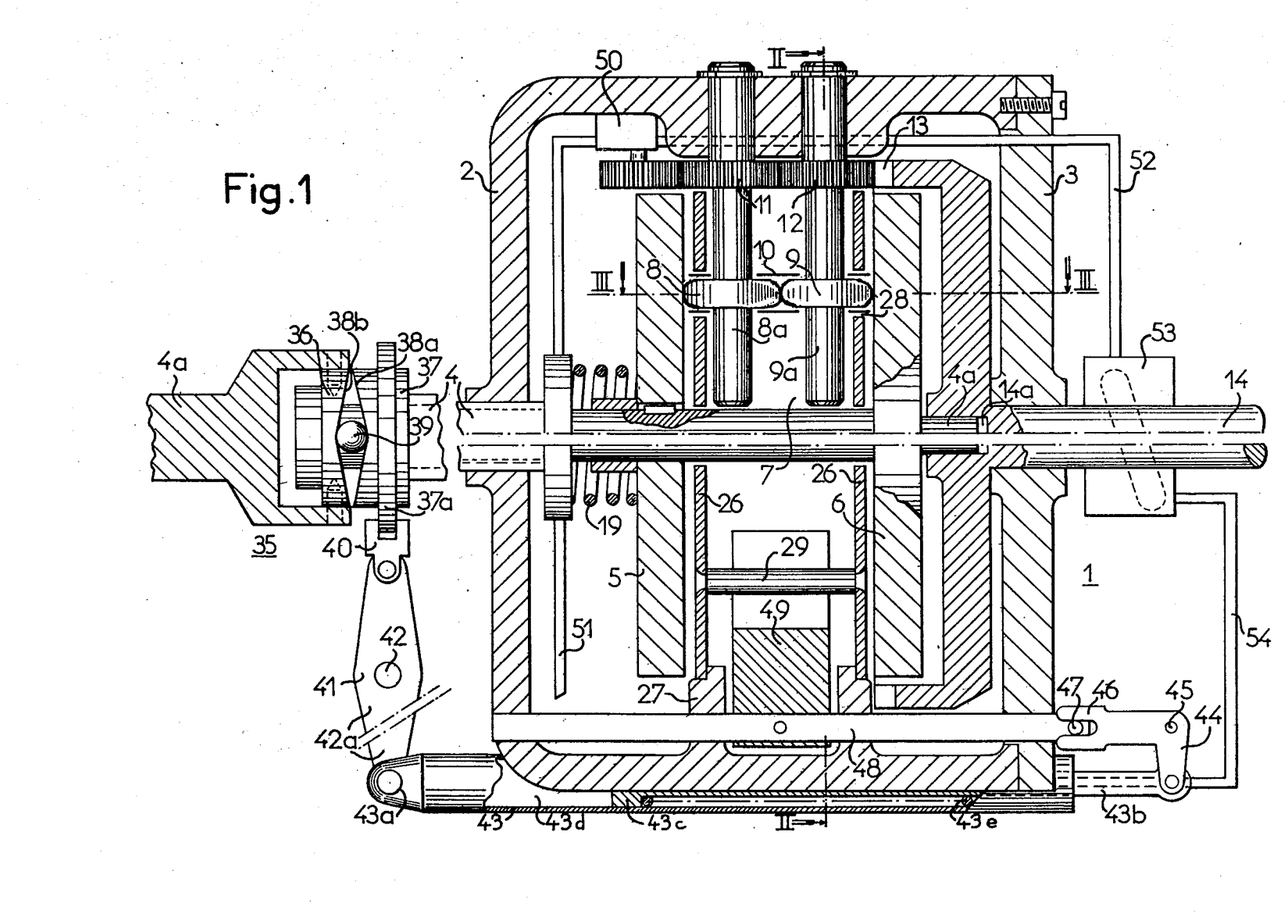
FIG. 1 is a longitudinal sectional view, partly schematic, of a first mode of realization.

The changer includes a housing 2 in the interior of which the various components are positioned. The housing is closed at one of its ends by a removable cover 3 which provides access to the moving parts of the changer.

The moving parts of the changer include an input shaft 4 and an output shaft 14 (load).

In the context of an automatic transmission for an automobile, the input shaft 4 would be connected to the drive shaft of a vehicle through a centrifugal gear box or a hydraulic coupling known in itself.

The output shaft 14 would be directly connected to a differential shaft. In this type of transmission it will be noted immediately that the operation of the changer is not subjected to a device which responds to the low pressure existing for example in the gas inlet pipe of the thermal motor of the vehicle.

The input shaft 4 of the changer, centered within housing 2, is provided with two circular plates 5, 6, fixed for rotation to input shaft 4.

The plate 5 is, however, axially mobile in order to be capable of transmitting the force applied by a spring 19 whose function will be described in detail later.

Between plates 5, 6 a space 7 is provided for the placement of at least one pair of idlers respectively 8, 9.

The idlers of one pair bear with rolling contact upon each other and also bear with rolling contact upon the confronting faces of plates 5, 6.

The idlers 8, 9 are fixed for rotation to a respective shaft 8a, 9a, these guidance shafts are parallel to the plane of rotation of plates 5, 6, and extend radially between input shaft 4 and the periphery of housing 2 which they traverse in centering bearings.

The idlers 8 and 9 are displaceable along the major portion of the length of shafts 8a and 9a. The radial displacement of the idlers between plates 5, 6 is achieved with the aid of a control fork 10 schematically represented in FIGS. 1 and 5 and whose manner of realization will appear in detail in FIGS. 3 and 4.

The shaft 8a, 9a are connected for rotation by means of pinions 11 and 12. Pinion 12 meshes with a toothed crown 13 fixed to output shaft 14.

According to a first embodiment of the invention, to make possible continuous adaptation of the change of ratio as a function of the angular velocity of the output shaft and as a function of the resistant couple with great sensitivity and with almost no effort, the contact between each pair of idlers 8, 9 and guidance shafts 8a and 9a is made through the intermediary of rolling elements, as a result of which it is possible to cause idlers 8, 9 to oscillate freely about a virtual axis designated by reference 20. The oscillatory movement causes the idlers to assume an inclined position and therefore causes them to describe, upon plates 5, 6, a spiral path practically without sliding. As soon as deflection of the idlers begins, in one direction or the other, there takes place a radial self-displacement of the idlers either from the periphery of plates 5, 6, toward shaft 4, or inversely.

Figure 3:
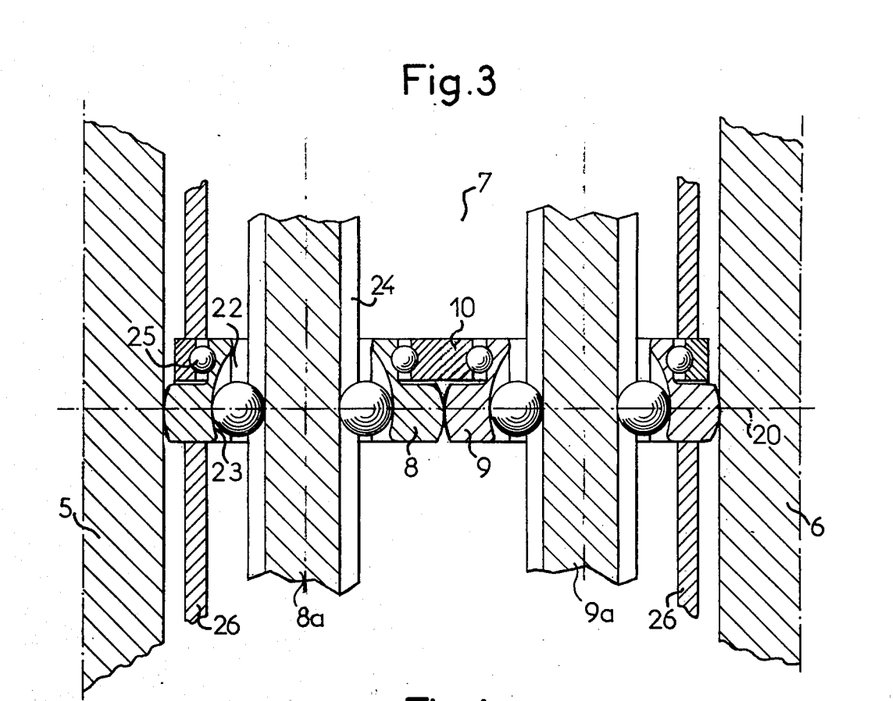
FIG. 3 is a sectional view, along III—III of FIG. 4, showing in double scale the detail of the oscillating mounting of the changer idlers.
Figure 4:
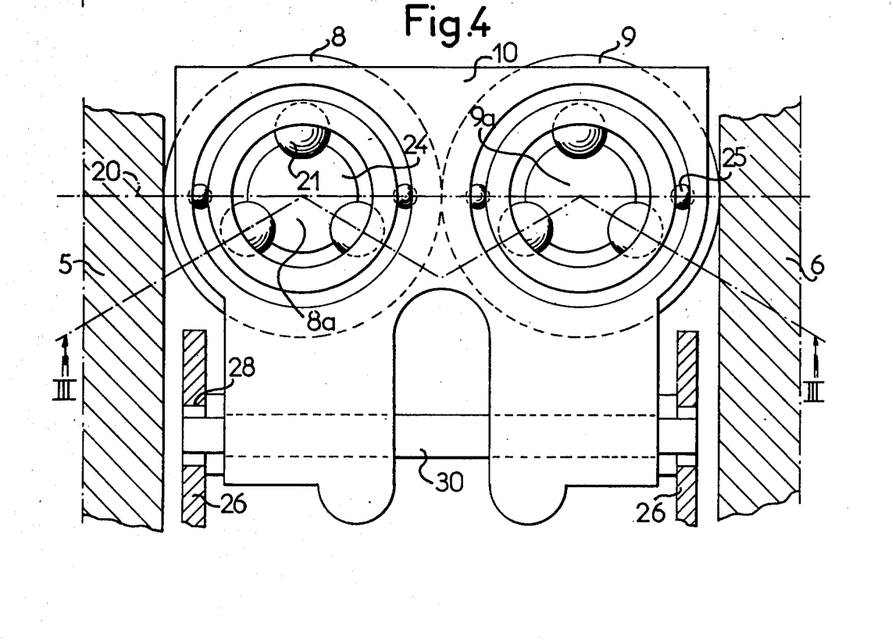
FIG. 4 is a view from above of the idlers showing details of the deflection control.

In the illustrative embodiment of FIGS. 3 and 4, the rolling elements are ball bearings 21, for example three, displaced by 120 degrees. Between shafts 8a and 9a and the idlers 8, 9, the ball bearings 21 are positioned within grooves 22 in two parts of spherical cross-sectional profile.

A portion of each groove is provided at 23 in the thickness of a idler 8 or 9, whereas the other portion of each groove is formed by the space which separates the axial channels 24 of shafts 8a or 9a.

In accordance with a complementary structural embodiment, idlers 8, 9 are retained in the control fork 10 by means of a ball bearing 25. In the mode of realization of FIGS. 1 to 4 the deflection control fork 10 for the idlers about virtual axis 20 receives its movement from a pair of rotary discs 26 positioned between the plates 5, 6 of the changer and centered within the radial guides 27 of housing 2.

Figure 2:
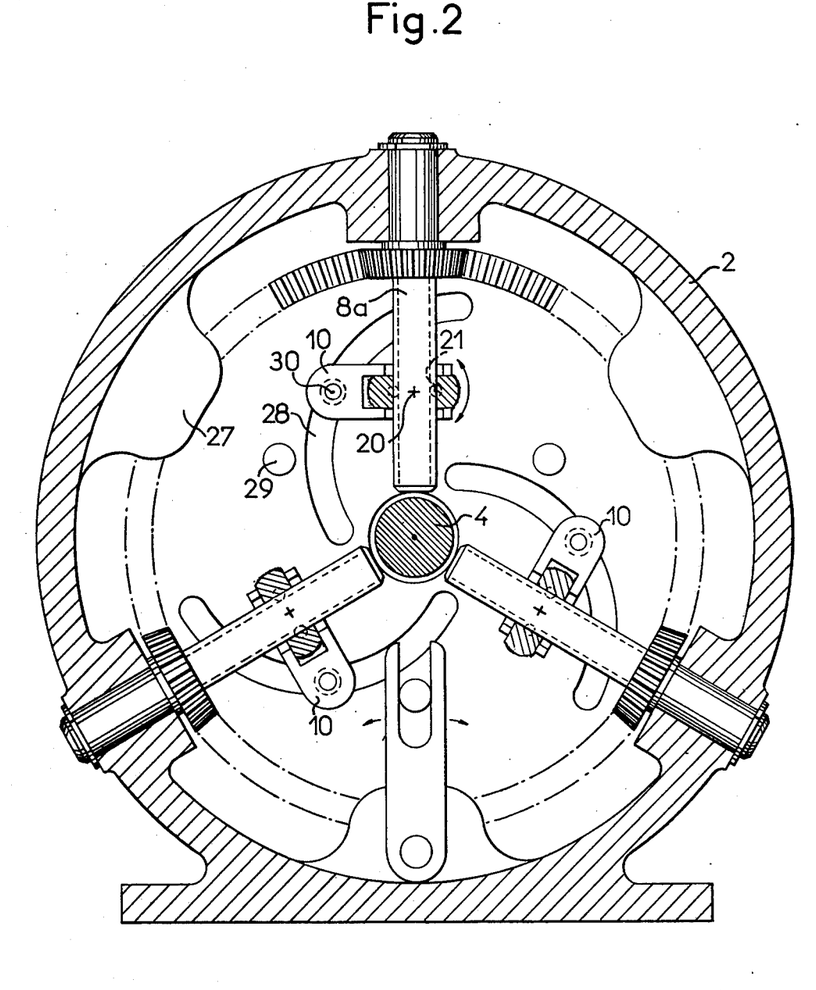
FIG. 2 is a transverse sectional view along II—II of FIG. 1.

Each disc 26 is provided with at least one radial slot 28 (three in the example illustrated), each slot having spiral configuration.

The discs 26 are fixed for rotation by means of connecting axles 29. Each spiral slot serves as guide for one axle 30 of fork 10.

According to another embodiment characterizing the invention, by reason of the very weak radial displacement inertia of the idlers between plates 5, 6, it is possible to effect operation of the transmission directly with a couple regulator and a centrifugal regulator, these two devices acting or co-acting upon the radial position of the idlers and, therefore, upon the transmission ratio of the changer.

Figure 5:
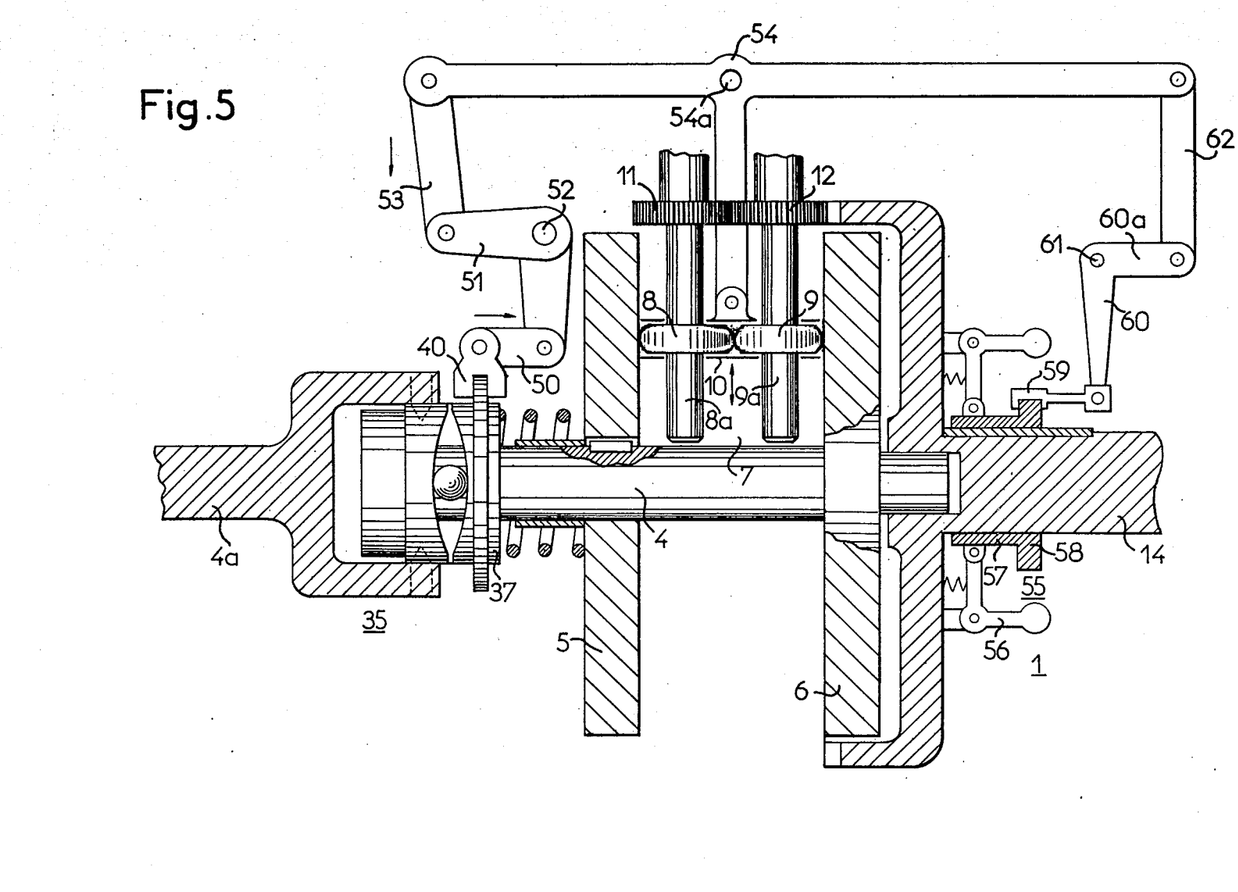
FIG. 5 is a longitudinal sectional view, partly schematic, illustrating a second mode of realization of the invention.

The couple regulator is common to the modes of realization of FIGS. 1 and 5. The couple regulator positioned upon the input shaft 4 of the changer is constituted by an elastic coupling designated by general reference 35. The coupling is formed by two cams 36, 37 having cam surfaces 38a, 38b, of sinusoidal configuration, facing each other and contacting one another through the intermediary of ball bearings 39. The first cam 36 is rotationally entrained by input shaft 4a. This first cam can, upon increase of the resistant couple of the transmission, turn about plate-carrying axle 4.

This rotation of the first cam causes, through the influence of the cam surfaces, rearward movement of cam 37 in the direction of plate 5. This movement is utilized, on the one hand, to increase the pressure effect of spring 19, on the other hand, to operate upon the radial position of the idlers.

In this mode of realization, axial movement of cam 37 is transmitted by a circular protruding shoulder 37a upon which rides a fork 40 connected to a lever 41 pivoting about a fixed point 42. Lever 41 has an end 42a connected to an end 43a of a hydraulic cylinder body 43. This cylinder has a control shaft 43b connected to a lever 44 which pivots about a fixed axle 45, that lever being attached by way of a fork 46 to axle 47 of a control shaft 48. Shaft 48 carries a fork 49 which rides upon a connecting axle 49 of disc 26. Operation of hydraulic cylinder 43 is further effected by an oil pump 50 set into rotation by pinion 11 of the changer. The oil is taken from housing 2 by a conduit 51 and is ducted through a conduit 52 to the inlet of a hydraulic centrifugal regulator 53 positioned upon the output shaft 14 of the changer.

Regulator 53 discharges through a conduit 54 into the hollow shaft 43b of the cylinder in such a manner as to traverse piston 43c and fill and cause variation in the volume of chamber 43d. A spring 43 surrounding shaft 43b of the piston causes the latter to be urged toward the bottom of chamber 43d. In the mode of realization of FIG. 5, modification of the radial position of the idlers is obtained by mechanical means.

To that effect it will be noted that the couple regulator 34 communicates its movement through the intermediary of cam 37 to a fork 40 equipped with a connecting member attached to a restoring lever 51 pivoting about a fixed point 52. The restoring lever connects to a connecting member 53 attached to a control lever 54 which can receive its movement from the couple regulator 35 or from the centrifugal regulator 55. This regulator is constituted of weights 56 adapted to axially displace a ring 57 under the influence of the centrifugal force.

Ring 57 transmits its axial displacement movement via a protruding circular shoulder 50 upon which rides a fork 59 connected to a lever 60 pivoting about a fixed point 61. The lever 60 has a branch 60a connected by a connecting member 62 to control lever 54.

Lever 54 has between its two ends a connecting axle 54a with a control shaft 63 itself connected to control fork 10 of idlers 8 and 9.

Regardless of the mode of realization which is used, the functioning of the transmission is the same.

To explain this operation it will be assumed that the input shaft 40a of the changer is entrained by an internal combustion engine with interposition of a centrifugal gear box or a hydraulic coupling of known type. It will also be assumed that the output shaft 14 of the changer is connected through a differential or other transmission to the driving wheel of a vehicle.

In a phase of operation without the resistant couple or one of very low value, the couple regulator 35 does not affect the radial position of the idlers 8, 9. In the same phase of operation, centrifugal regulator 53 or 58 modifies the position of the idlers 8, 9 as a function of the rotational velocity of shaft 14. When that velocity increases, the idlers 8, 9 are radially displaced in such manner as to tend toward the lower ratio of speeds, that is in the vicinity of 1 to 1 between the input and output shafts of the changer. When the velocity of the output shaft 14 decreases, centrifugal regulator 53, 55 tends to displace the idlers 8, 9 toward the higher transmission ratio (demultiplication).

In a phase of operation exceeding a predetermined threshold of the resistant couple, the couple regulator 35 enters into operation to affect the radial position of idlers 8 and 9.

When the resistant couple increases regulator 35 tends to displace the idlers 8, 9 toward the greater transmission ratio (demultiplication), thereby freeing the engine operation which increases.

When the resistant couple stabilizes or decreases, the couple regulator tends to displace idlers 8, 9 toward the lower transmission ratio in the vicinity of 1 to 1.

In case of a fast or slow interruption of the engine operation, for example when one no longer presses on the accelerator pedal, there takes place a reversal of the action of the couple regulator, which then acts upon the displacement of idlers 8, 9 toward the greater transmission ratio, thereby having the effect of applying engine braking to the vehicle through increase of the engine operation.

As a result three principal operating profiles can occur:
  accelerator pedal in middle position, the resistant couple almost zero (economical maintenance of level vehicle speed), the radial position of the idlers is stabilized by the centrifugal regulator 53, 55
  accelerator pedal in fully open position, the motor couple suddenly rises, the action of the couple regulator 35 tends to displace the idlers 8 and 9 toward the greatest demultiplication ratio.

Finally it will be noted that the couple regulator, through the axial displacement path of cam 37, acts upon the force applied by compression spring 19 for plates 5, 6, thereby making it possible to vary the contact pressure between plates and idlers as a function of the force of the couple to be transmitted. Due to the double regulator arrangement of the transmission and the oscillatory mounting of the changer idlers, one obtains continuous adaptation of the transmission ratio. As a result, the idlers are hardly ever stationary on a given rolling path, which is particularly significant for the life of the contact elements because the lubricant film is never broken and the wear is distributed over the entire contact zone between idlers and plates.

According to any of the modes of realization illustrated in FIGS. 6 to 14, the idlers of one pair 8, 9 bear only with rolling point contact upon plates 5, 6 subjected to a pressure force tending to push them against the idlers.

In this mode of realization there therefore exists a space 65 between the idlers which no longer bear upon each other with rolling contact.

To permit transmission of the couple between plates, idlers and guidance shafts there are contemplated various modes of realization of the entrainment means which, in each case, take into account the absence of idler to idler contact.

Figure 6:
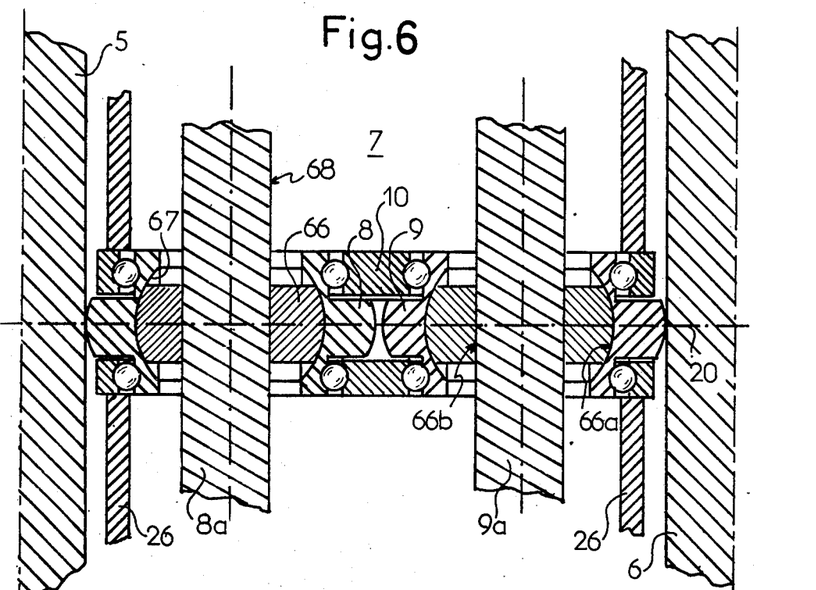
FIG. 6 is a sectional view, along III—III of FIG. 7.
Figure 7:
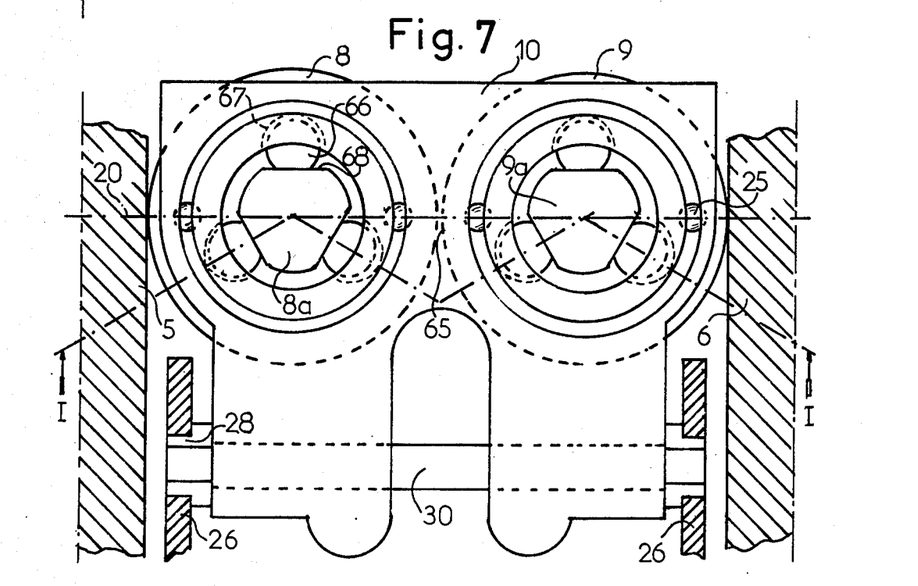
FIG. 7 is a top view of the idlers showing details of the deflection control.

In the mode of realization illustrated in FIGS. 6 and 7, the oscillatory connection between idlers 8, 9 and and guidance shafts 8a, 9a is provided by entrainment members 66. These entrainment members have, on the one hand, a spherical contact surface 66a, positioned in a groove 67 also of spherical profile provided within the internal opening of the idler and, on the other hand, on the opposite side of the said spherical contact surface, a second plane contact face 66b bearing upon a plane guidance land 68 provided longitudinally upon the guidance shaft of the idlers.

Thanks to this structural solution, the idlers can displace on the one hand by sliding along the longitudinal guidance lands of shafts 8a, 9a, and on the other hand these idlers can oscillate by means of their spherical contact face when fork 10 is urged into deflection.

Figure 8:
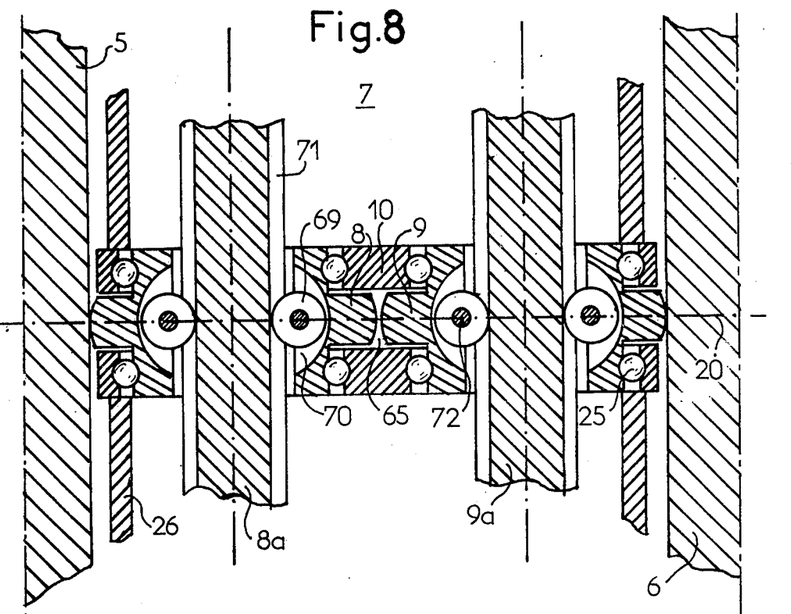
FIG. 8 is a sectional view along III—III of FIG. 9.
Figure 9:
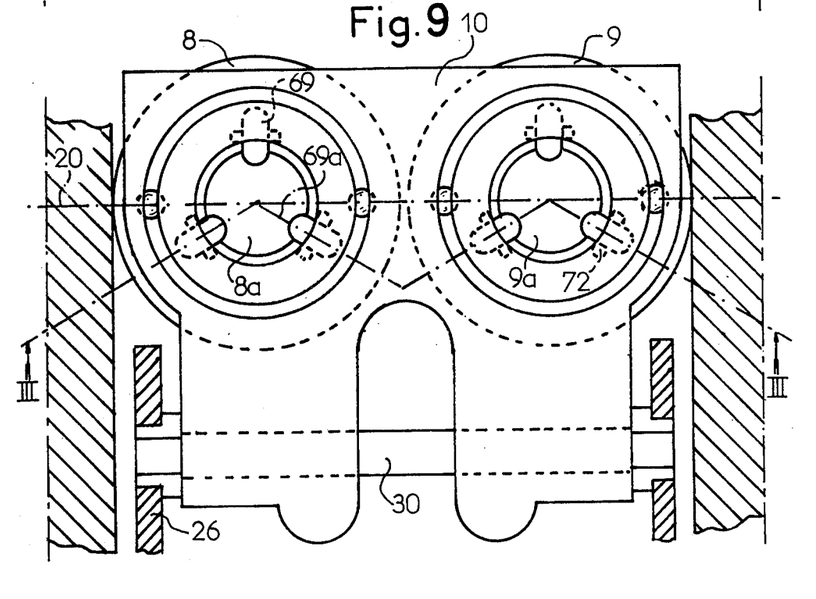
FIG. 9 is a top view of FIG. 8.

In the mode of realization illustrated in FIGS. 8 and 9, the oscillatory connection between idlers 8, 9 and guidance shafts 8a, 9a is achieved by entrainment members 69 taking the form of wheels.

The planes of rotation of these wheels pass through radii 69a of the guidance shafts of the idlers.

Wheels 69 are mounted partly in longitudinal grooves 70, of curved profile, provided in the internal opening of the idlers and partly in longitudinal grooves 71 provided upon the idler bearing shafts 8a, 9a. The wheels are borne upon axles 72 perpendicular to the longitudinal grooves 70 of the central openings of the idlers.

Thanks to this arrangement there is obtained rolling contact both between wheels 69 and the internal grooves of the idlers and these same wheels 69 and the grooves formed upon shafts 8a, 9a.

Figure 10:
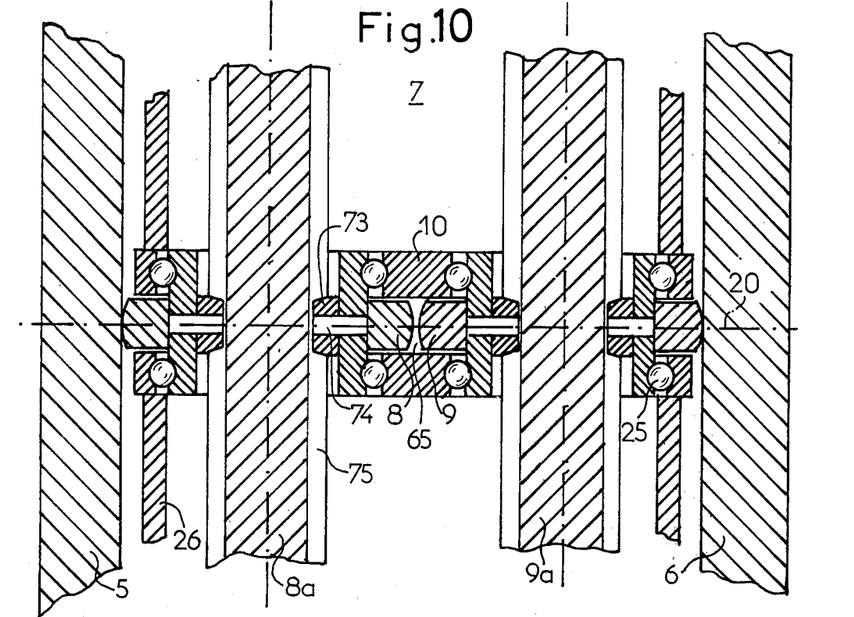
FIG. 10 is a sectional view along III—III of FIG. 11.
Figure 11:
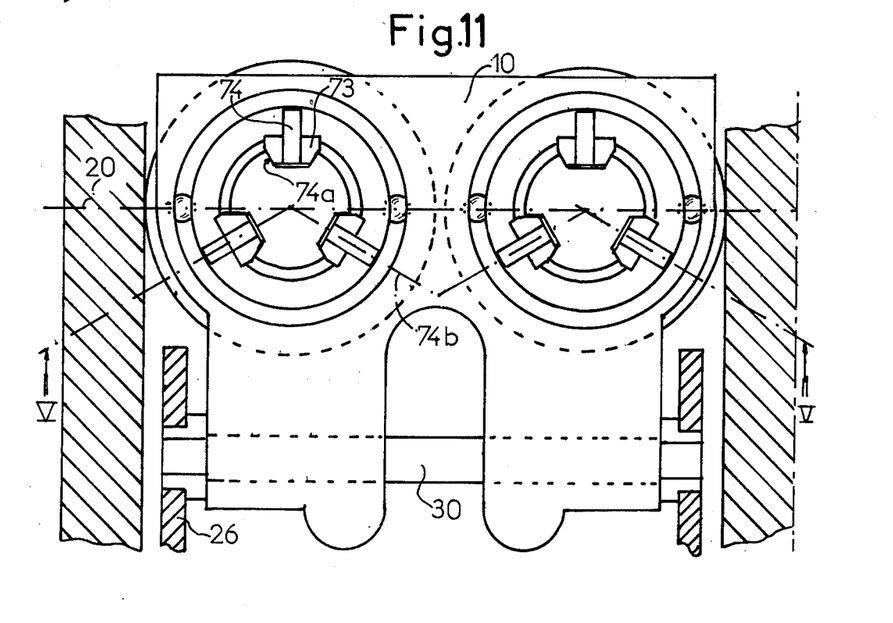
FIG. 11 is a top view of FIG. 10.

In the mode of realization illustrated in FIGS. 10 and 11, the oscillatory connection between idlers and guidance shafts is achieved by entrainment members 63 which take the form of wheels. The wheels 73 are borne upon axles 74 aligned with radii 74a passing through the center of guidance shafts 8a, 9a. The planes of rotation of wheels 73 are perpendicular to wheel bearing axles 74. The wheel axles 74 are fixed to the idlers radially in their thickness. The wheels 74 have on the side facing the guidance shaft a lateral contact face 74a in the shape of a truncated cone capable of rolling between the conical walls of a longitudinal groove 75 provided along guidance shafts 8a, 9a.

It will be noted that in the modes of realization of FIGS. 6 to 11, the entrainment members and corresponding guidance grooves are always three in number. In the mode of realization of FIGS. 10 and 11, there is still rolling contact between the entrainment members and the guidance grooves of shafts 8a, 9a particularly under the influence of the rotational couple of the idlers.

Figure 12:
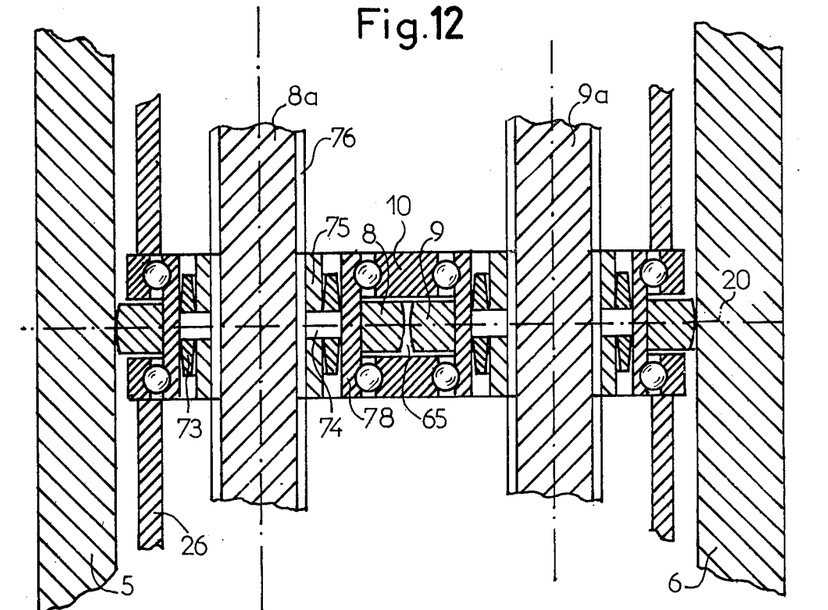
FIG. 12 is a sectional view along III—III of FIG. 13
Figure 13:
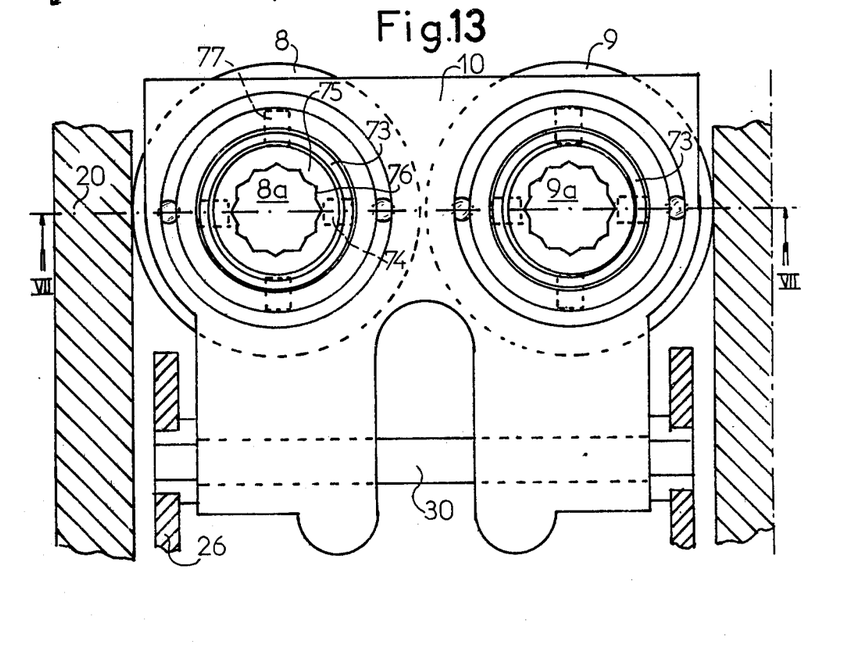
FIG. 13 is a top view of FIG. 12.

In the mode of realization of FIGS. 12 and 13, the oscillatory connection between idlers 8, 9 and guidance shafts 8a, 9a is of the gimbal type. This connection is achieved by an entrainment member 73, taking the form of a ring coaxially positioned within the central opening of an idler. Ring 73 thins out symmetrically on one side and the other of its median plane of rotation, in such manner that the idlers can oscillate relative to this ring and relative to shafts 8a, 9a. Ring 73 can oscillate on the one hand around the two first axles 74 which are diametrically opposed, positioned and fixed to a ring 75 which slides upon channels 76 of shafts 8a, 9a. On the other hand, ring 73 can oscillate around the two second axles 77, visible in FIG. 8, these axles also being diametrically opposed and displaced by 90° with respect to the first two axles 74. The said second axles 77 are fixed to a sleeve or cage 78, itself fixed for rotation to idlers 8 or 9.

Thanks to this structural solution, there is achieved a gimbal joint particularly suitable for transmission of the couple between plates 5, 6, idlers 8, 9, and guidance shafts 8a, 9a.

Figure 14:
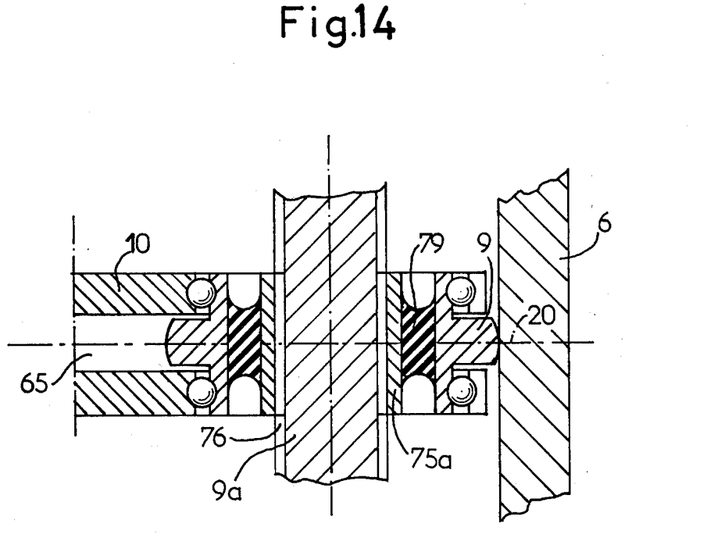
FIG. 14 is a view, partly in section, showing an elastic coupling between idlers and guidance shafts.

Finally, in the mode of realization illustrated in FIG. 14, partly in cross-section, the connecting member between idlers and shafts is provided by an entrainment member 79 of elastic material joined on the one hand to a ring 75a of the type described in connection with the mode of realization of FIGS. 7 and 8 and on the other hand to the internal opening face of the idler.

It will be understood that this mode of construction permits a deflection movement of the idler around axial line 20. This mode of construction particularly permits the construction of a non-lubricated changer.

Regardless of the mode of realization used, it will be noted that the radial displacement of the idlers is obtained by a very slight angular deflection of these idlers.

One can also provide, for the radial sliding of the idlers upon their guidance shafts, ball bearings to reduce the forces due to the radial displacement.

One can also provide in order to effect the deflection movements of the idlers hydrostatic ball joints between idlers and guidance shafts.

It will be understood that the invention is not limited to the embodiments described and shown above, for which one could also provide other variants, without thereby departing from the scope of the attached claims.

I claim:

1. Transmission device for speed changing, comprising
    a mechanical speed changer having an input shaft and an output shaft, one of which carries two plates fixed for rotation and spaced from each other,
    at least one pair of idlers carried by a fork and positioned within said space and capable of being radially displaced between these plates along guidance shafts to which they are fixed for rotation, the idlers of one pair bearing with rolling point contact against the plates subjected to a pressure force tending to push them against the idlers,
    a control device connected to the transmission by at least one couple regulator enabling modification of the radial position of the said pair of idlers,
    the idlers of one pair being mounted with freedom for oscillation each relative to its own guidance shaft about the perpendicular passing through the contact points between idlers and plates, the system being characterized in that the connection between the idlers and the guidance shafts is provided by entrainment members arranged on the one hand to be axially displaced along the said shafts, on the other hand to fix for rotation the idlers and the shafts, again on the other hand to enable the oscillatory deflection of the idlers about the said perpendicular passing through the contact points between idlers and plates.

2. Device according to claim 1, characterized in that the idlers of one pair bear on the one hand with rolling point contact against each other and on the other hand with rolling point contact against the plates.

3. Transmission device according to claim 1 characterized in that the idlers of one pair form only rolling point contact with the plates subjected to a pressure force tending to push them against the idlers.

4. Transmission device according to claim 1, characterized in that the idlers of the given pair are attached to a deflection control fork through a ball-bearing, each pair of idlers being given its movement by a pair of rotary discs positioned between the plates of the changer, each disc being provided with at least one radial slot of spiral shape in which the end of an axle carried by the said fork is engaged.

5. Transmission device according to claim 1, characterized in that the input shaft or the output shaft of the changer is provided with a couple regulator acting upon the transmission ratio when the couple exceeds a predetermined threshold, this couple regulator being constituted of an elastic coupling formed of two cams having annular cam surfaces, of sinusoidal configuration facing each other, and in contact with each other through idlers or ball-bearings, a first cam being capable, upon increase of the resistant couple, of turning about one of the input or output shafts of the transmission to produce axial displacement of a second cam fixed for rotation with one of said shafts, the said axial displacement being adapted to produce modification of the transmission ratio between the input shaft and the output shaft of the changer.

6. Transmission device according to claim 1, characterized in that the connecting means which control the deflection and, consequently, the radial position of the idlers are constituted on the one hand,
by a centrifugal regulator positioned on the output shaft of the changer (load) and adapted to modify the radial position of the idlers as a function of the speed of rotation of the said output shaft,
of a couple regulator, positioned on the input shaft of the changer and adapted to equally modify the radial position of the idlers, when the resistant couple exceeds a predetermined threshold.

7. Transmission device according to claim 1, characterized in that the couple regulator positioned upon the input shaft of the changer is constituted by an elastic coupling formed of two cams having annular cam surfaces, of sinusoidal configuration, facing each other, and in contact with each other through ball-bearings or idlers, a first cam capable, upon increase of the resistant couple, of turning about the plate bearing shaft of the changer, and of producing axial displacement of a second cam fixed for rotation with said plate carrying shaft, said second cam bearing upon the pressure spring between plates and idlers in such manner as to modify, as a function of the resistant couple, on the one hand the pressure between plates and idlers, on the other hand, the radial position of said idlers through a connection between said second cam and the control fork of said idlers.

8. Transmission device according to claim 1, characterized in that the connecting means acting upon the radial position of the idlers are constituted by a centrifugal hydraulic regulator positioned upon the output shaft of the changer (load) to feed a hydraulic cylinder whose one end is connected by a mechanical link adapted to angularly displace the displacement control disc of an idler bearing fork, the other end of said hydraulic cylinder being connected to the axially mobile cam, of the couple regulator.

9. Transmission device according to claim 1, characterized in that the idler position control fork is displaced on the one hand directly by a mechanical link with the axial displacement cam of the couple regulator positioned on the input shaft of the changer and, on the other hand, also directly by a mechanical linkage connected to the mobile ring of a centrifugal mechanical regulator positioned upon the output shaft of the changer.

10. Transmission device according to claim 1, characterized in that the oscillatory connection between idlers and guidance shafts is provided by entrainment members taking the form of ball-bearings positioned within grooves in two parts, of spherical transverse profile, one part of each groove being provided in the radial thickness of an idler, the other part being provided in the space which separates axial channels provided upon the generating surfaces of the guidance shafts.

11. Transmission device according to claim 1, characterized in that the oscillatory connection between idlers and guidance shafts is provided by entrainment members having on one hand a spherical contact surface positioned in a groove of spherical profile provided in the internal opening of the idler, and on the other hand on the opposite side of said spherical contact surface a second plane contact surface, bearing upon a plane guidance land provided on the guidance shaft of the idlers.

12. Transmission device according to claim 1, characterized in that the oscillatory connection between idlers and guidance shafts is provided by entrainment members taking the form of wheels whose planes of rotation pass through radii of the guidance shaft of the idlers, these wheels being positioned partly within longitudinal grooves provided within the internal opening of the idlers and partly within longitudinal grooves provided within the idler bearing shafts, these wheels being carried by axles perpendicular to the longitudinal grooves of the central openings of the idlers.

13. Transmission device according to claim 1, characterized in that the oscillatory connection between idlers and guidance shafts is provided by entrainment members taking the form of wheels carried by axles aligned with radii passing through the center of the guidance shafts, the planes of rotation of said wheels being perpendicular to the wheel bearing axles, the wheel axles being fixed to the idlers, radially, in their thickness, the wheels having on the side of the guidance shafts a truncated cone lateral contact face, adapted to roll between the sides of a longitudinal groove of the same profile, provided along the guidance shafts.

14. Transmission device according to claim 1, characterized in that the oscillatory connection beteen idlers and guidance shafts is of the gimbal type, this connection being provided by an entrainment member taking the form of a ring positioned coaxially in the internal opening of an idler, this ring thinning out symmetrically on one side and the other of its median plane of rotation, this ring being capable of oscillating on the one hand, around two first diametrically opposed axles positioned upon a ring capable of sliding on the idler bearing shaft, and on the other hand capable of oscillating around two second axles diametrically opposed displaced by 90° from the two first axles, said second axles being fixed to the idler.

15. Transmission device according to claim 1, characterized in that the oscillatory connection between idlers and guidance shafts is provided by entrainment members of elastic material, for example of elastomeric type.

16. Device according to claim 1, wherein each guidance shaft is substantially rigid, and the entrainment members for connection between shaft and idler are so constructed that the oscillatory deflection of the idlers takes place without bending of the guidance shaft.

17. Device according to claim 16, wherein the fork carrying each idler is pivoted so as to enable the idler to caster with respect to the fork pivot, whereby the oscillating deflection of the idler with respect to its guidance shaft takes place.

* * * * *